Aug. 5, 1941.   W. J. GIBBS   2,251,874
STORAGE AND DISPENSING APPARATUS
Filed Jan. 31, 1940   5 Sheets-Sheet 1

Inventor
William J. Gibbs

Aug. 5, 1941.  W. J. GIBBS  2,251,874
STORAGE AND DISPENSING APPARATUS
Filed Jan. 31, 1940  5 Sheets-Sheet 2
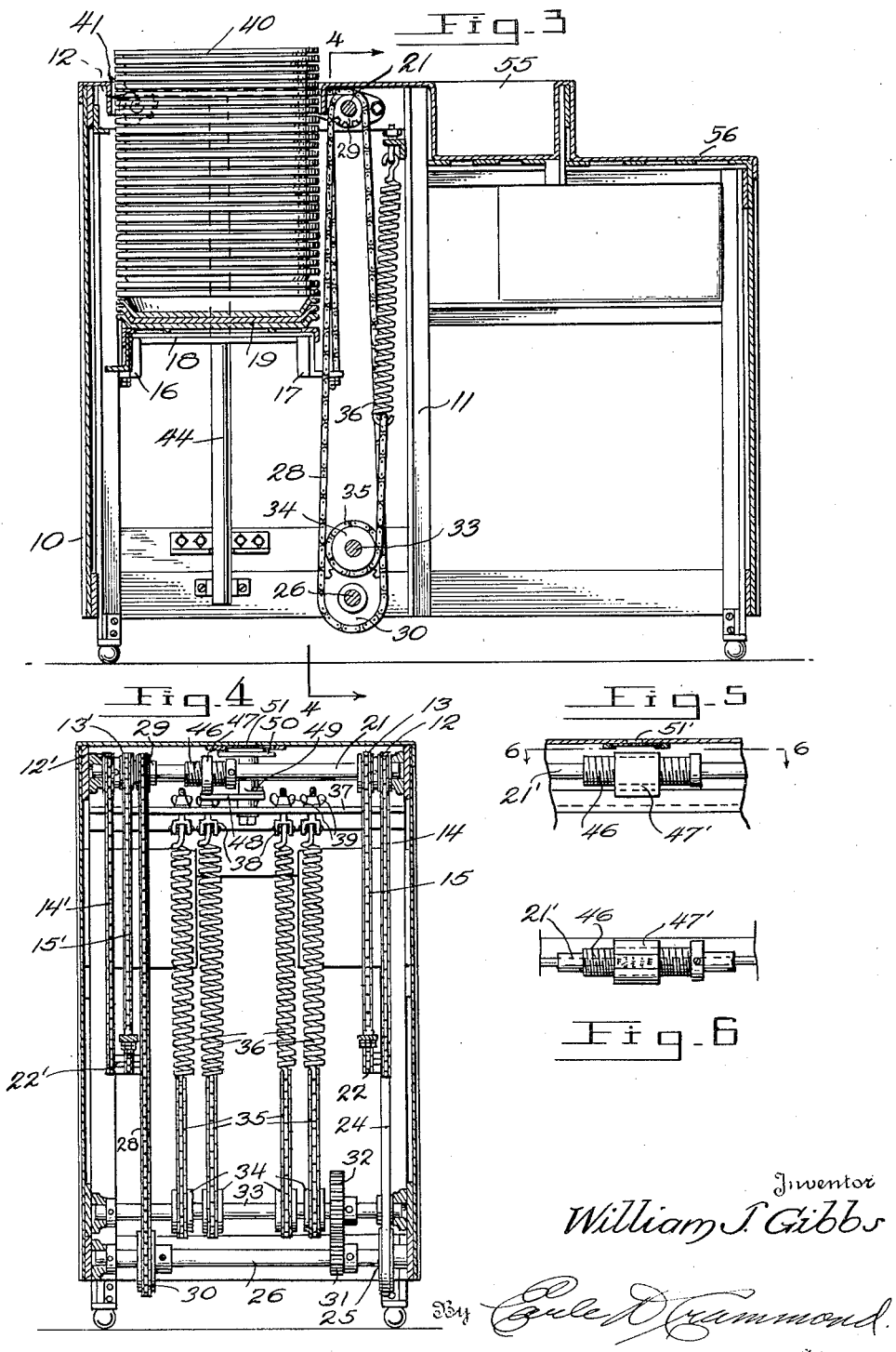

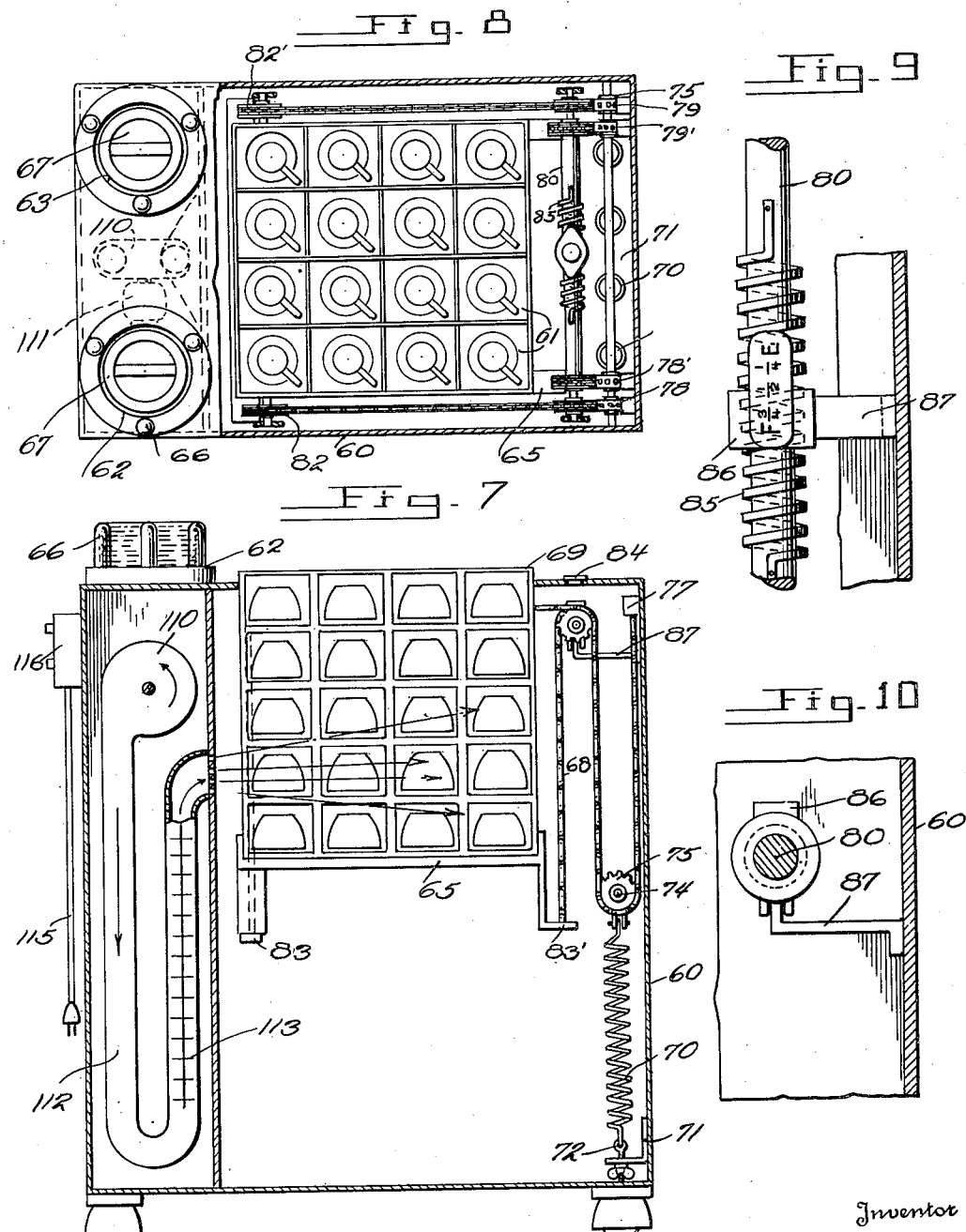

Aug. 5, 1941.    W. J. GIBBS    2,251,874
STORAGE AND DISPENSING APPARATUS
Filed Jan. 31, 1940    5 Sheets-Sheet 4
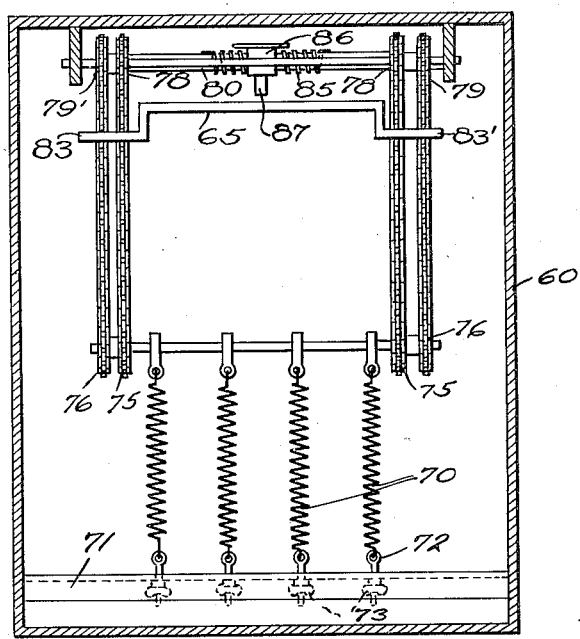
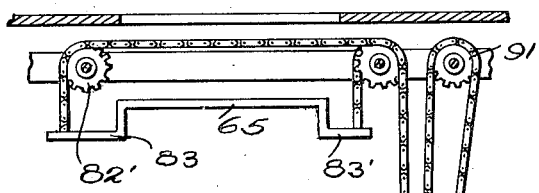
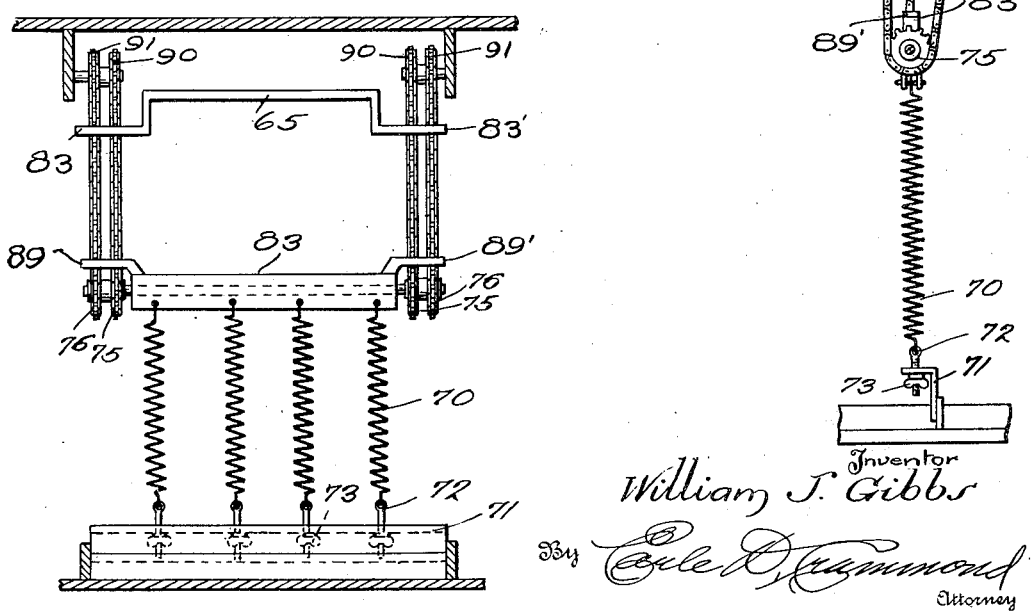
Inventor
William J. Gibbs
By Earle D. Drummond
Attorney Aug. 5, 1941.   W. J. GIBBS   2,251,874
STORAGE AND DISPENSING APPARATUS
Filed Jan. 31, 1940   5 Sheets-Sheet 5

Inventor
William J. Gibbs
By Earle D. Trammond
Attorneys

Patented Aug. 5, 1941

2,251,874

UNITED STATES PATENT OFFICE

2,251,874

STORAGE AND DISPENSING APPARATUS

William J. Gibbs, Brooklyn, N. Y.

Application January 31, 1940, Serial No. 316,673

9 Claims. (Cl. 312—71)

The present invention relates to apparatus for storing and feeding stacked articles, such as trays, dishes including plates, saucers, cups and the like, or any articles of uniform size and weight capable of being stacked. The application is a continuation-in-part of my co-pending application Serial No. 130,787, filed March 13, 1937.

It is one of the objects of the invention to provide apparatus for storing and delivering stacked articles in such position that the uppermost unit of the stack is presented for use at a predetermined convenient height and those below it are encased or held in protected position ready to be automatically fed upwardly upon removal of said uppermost member whereby the next member or unit beneath it comes automatically into position at said predetermined height. The motivating means may be any one or any combination of such means as springs, weights, compressed air, hydraulic head, electric coil and armature, electric motor or other equivalent means, and in structure exemplifying the present invention the height of a stack or the number of units or elements therein or the total weight thereof determines the actuation so that in each case the uppermost member thereof is brought automatically to the predetermined height or position convenient for removal. Moreover, the invention contemplates a device in which the actuating means can be adjusted so that operation will take place when the number of pieces in the stack is small or has been reduced even to one. Also, the balance and actuation can be adjusted so that two or more of the units are in position to be taken off and a corresponding number moved up into an exposed position for subsequent removal.

Further objects and advantages will be apparent from the following detailed specification of illustrating embodiments of the invention, reference being had in the specification to accompanying drawings wherein like numerals represent like parts throughout the several views, and in which—

Fig. 3 is a vertical sectional view taken along the line 3—3 of Fig. 2 and looking in the direction of the arrows;

Fig. 4 is a vertical section view taken along the line 4—4 of Fig. 3, and looking in the direction of the arrows;

Fig. 5 is an elevation view of an alternative embodiment of a gauge shown in Fig. 2 and in the upper part of Fig. 4;

Fig. 6 is a plan view of the gauge of Fig. 5, looking in the direction of the arrows;

Fig. 7 is a broken top plan view of another embodiment of the invention;

Fig. 8 is a sectional elevation view taken along the lines 8—8 of Fig. 7;

Figs. 9 and 10 are enlarged detail views of the indicating device in Fig. 7;

Fig. 11 is a sectional view taken on the line 11—11 of Fig. 8, looking in the direction of the arrows;

Figs. 12 and 13 are diagrammatical elevation views taken at right angles to each other of an embodiment of the invention similar to that of Figs. 7, 8 and 11 but in which a modified pulley arrangement is used;

Figure 1:
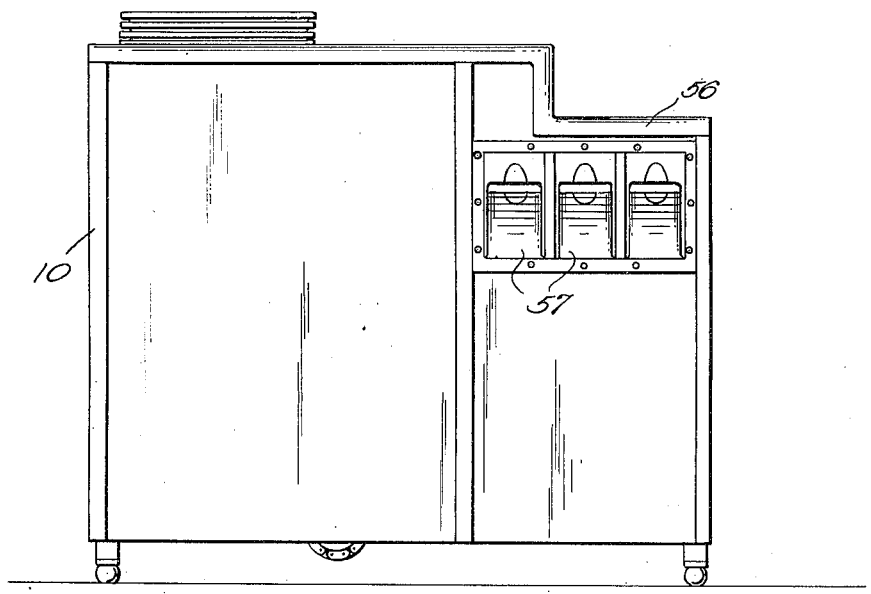
Fig. 1 is a front elevation of a service casing enclosing one embodiment of the invention adapted for holding and feeding trays.

Referring to Figs. 1 to 4 of the drawings, a casing 10 encloses a framework 11 which at one end near the top supports the spaced apart pairs of sprockets 12, 12' and 13, 13', over which pass the two pairs of sprocket chains 14, 14' and 15, 15', which at respective ends connect with the two pairs of lugs 16, 16' and 17, 17', which in turn support the four corners of carrier 18 which has fixed thereto a tray 19. Said chains 14, 14' extend vertically to and over the sprockets 12, 12' rotatably mounted on aligned stub shafts fixed to the frame and thence horizontally to and over sprockets 20, 20' mounted on a common shaft 21 with said sprockets 13, 13' and thence downwardly for end connection with connector lugs 22, 22'. Lug 22 serves to connect chains 14 with chain 15 extending from lug 17 upwardly and over sprocket 13 and a tape 24 which passes downwardly to and is fixed on a drum 25 fixedly mounted on the rotatable shaft 26 mounted near the bottom of said framework 11. Said lug 22' connects chains 14' and 15' to an endless chain 28 which at an upper turn passes over a sprocket 29 mounted on said shaft 21 and at a lower turn passes under a sprocket 30 mounted on said shaft 26. The arrangement is such that chains 14, 14' and 15, 15' have uniform movement when the carrier is raised or lowered.

On said shaft 26 is a gear pinion 31 which meshes with a gear 32 mounted on a shaft 33 which carries four drums 34, 34 to which latter connect respective ends of sprocket chains 35, 35 whose upper ends connect to ends of corresponding tension springs 36, 36 whose upper ends in turn connect to the horizontal bar 37 by means of respective clevis bolts 38, 38 having the adjusting wing nuts 39, 39.

On said fixed tray 19 is shown a load of stacked trays 40, 40 to whose weight, as translated through said pinion 31 and gear 32, said springs 36, 36 are calibrated so that the addition or removal of one or more of said trays 40 to or from the stack results in a proportional lowering or raising of the said carrier 18 and its stacked trays 40 whereby the upper level of said stacked trays 40 is always at a substantially predetermined elevation with respect to an opening 41 in the upper surface of said casing 10, said pinion 31 and gear 32 being at a predetermined ratio with respect to each other and to the size of said drums 34, 34 whereby the lower ends of said springs 36, 36 move a shorter distance than said carrier 18.

At said opening 41, said casing 10 has formed a downwardly extending flange 43 which serves as a guide for said stacked trays 40, 40, and a pair of vertical rods 44, 44 fixed to said framework 11 one on each side, serve as tray guides below said flange 43.

On said shaft 21 a screw 46 carries a nut 47 which connects to and is held against rotation by one end of a link 48 whose other end connects to a horizontal crank arm 49 rotatably mounted on said horizontal bar 37 and carrying on its upper end a gauge 50 which shows through a window 51 in the upper surface of said casing 10 and indicates the number of trays or proportion of full load at any time on said carrier 18. An alternated form of gauge is shown in Figs. 5 and 6 in which a nut 47' is extended in length and has marked thereon indicating marks which register with a window 51' corresponding to said window 51. In each instance, the said indicators are arranged to present markings visible through a window aperture in the casing to show the loaded condition of the carrier.

Figure 2:
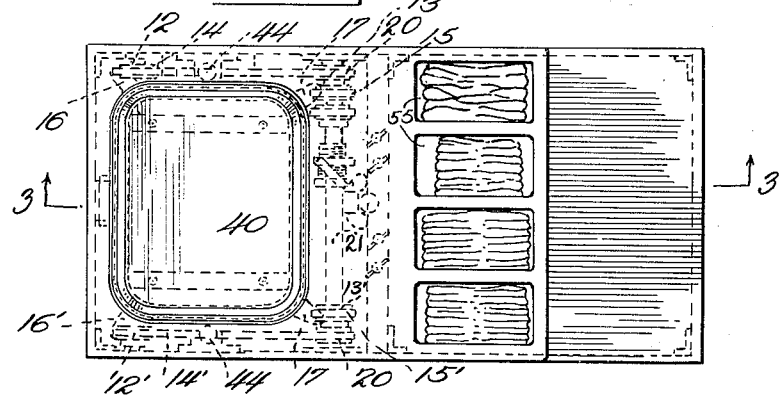
Fig. 2 is a top plan view of the same with some details of the enclosed mechanism shown in dotted lines.

Referring particularly to Figs. 1, 2 and 3, the upper part of said casing 10 has formed therein, adjacent said opening 41, the receptacles 55, 55 for knives, forks, spoons and other cutlery and adjacent thereto a step 56 for holding an individual tray which has been removed from said stacked trays 40 while cutlery is being taken from said receptacles 40 to be placed on the individual tray. Beneath said receptacles 55, 55 and said step 56, said casing 10 has formed in the side thereof the napkin boxes 57, 57.

Referring to Figs. 7 to 11, inclusive, the embodiment of the invention therein illustrated is arranged for storing and feeding cups and saucers or small plates and employs a modified form of motivating means and means for heating articles on the carriers. Housing 60 has its top portion provided with a plurality of spaced openings 61, 62 and 63, for passage therethrough of separate stacks of articles. Opening 61 is adapted for passage of a stack of racks 64, each of said racks being adapted to accommodate a number of articles such as cups or the like, said stack of racks being supported and held in a predetermined position according to the weight of the load by the vertically movable carrier 65 and its motivating means. The other top openings 62 and 63 are provided with guides 66 and are adapted for passage therethrough of stacks of saucers or small plates, said stacks being supported and held in predetermined position according to the weight of the loads by vertically movable carriers 67 below the openings, which carriers are supported and motivated by calibrated compression springs (not shown). The compression spring motivating means is of the type described and claimed in my Patent No. 2,251,875, issued August 5, 1941, and may be built into the assembly or may be in the form of separate detachable units insertible and removable through the openings in the top of the housing.

The tray carrier 65 is movable up and down by means of four sprocket chains, outer chains 68, 68' and inner chains 69, 69', and tension springs 70 as follows. An angle iron 71, secured to the bottom part of said housing 60, has projecting upwardly therethrough a plurality of eye bolts 72, whose positions are adjustably held by corresponding wing nuts 73 or equivalents. Said tension springs connect at their lower ends to respective ones of said eye bolts 72 and at their upper ends to a floating cross bar 74 which latter at each end carries rotatably mounted thereon an inner sprocket 75 and an outer sprocket 76. Aligned with said sprockets are a plurality of supporting lugs 77 on the housing to which ends of the inner and outer sprocket chains are anchored. The respective inner and outer sprocket chains pass downwardly from said lugs around the respective inner and outer sprockets 75 and 76, thence upwardly and over inner and outer sprockets 78, 78' and 79, 79', on shaft 80, rotatably mounted in suitable bearings and supported in the housing near its top, the inner chains passing thence downwardly to respective lugs 81 and 81', extending from the carrier, and the outer chains passing horizontally to and over respective aligned sprockets 82, 82' rotatably mounted to the supporting housing and thence downwardly to lugs 83, 83' extending from said carrier. The said tray carrier is thus counterbalanced by said tension springs 70 at the contracted position of the latter and loads of various weights on said carrier are counterbalanced at various extended positions thereof to hold the upper surface of the load of whatever value, within the predetermined strength of said springs, at a predetermined position with respect to said opening 61.

The volumetric condition of storage of trays on the carrier is indicated through a window 84 in the top of the housing. The indicating means employed is similar to that described above in connection with Figs. 5 and 6 of the drawings except that the helix 85 is fixed to shaft 80 for movement of the indicator 86, which indicator is prevented from rotation by bracket 87 supported by the housing and having an upturned flange slidably engaging in a slot of the indicator.

In Figs. 12 and 13, there is shown diagrammatically an arrangement similar to that of Figs. 8 and 11, except that the floating cross bar 83 carries lugs 89, 89' which extend upwardly and outwardly over said sprockets 75 and 76 and the housing has rotatably mounted thereon additional aligned inner and outer sprockets 90, 90 and 91, 91, over which sprockets the respective inner and outer sprocket chains passing upwardly from said sprockets 75 and 76 are trained, said chains passing thence downwardly for fixation at their ends to said carrier lugs 89, 89'.

Figure 14:
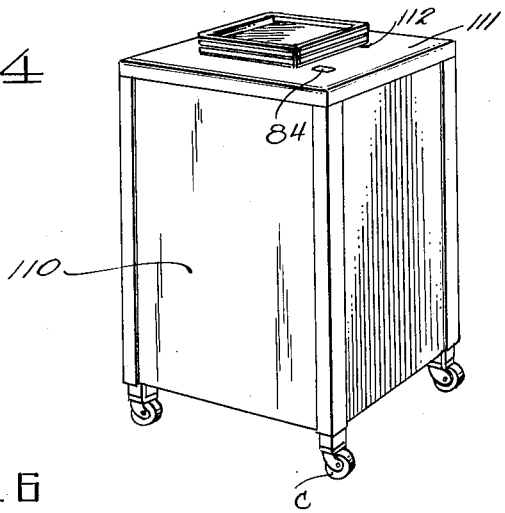
Figs. 14 and 15 are, respectively, a perspective view and a plan view of another embodiment of the present invention adapted to hold and feed a stack of trays.
Figure 16:
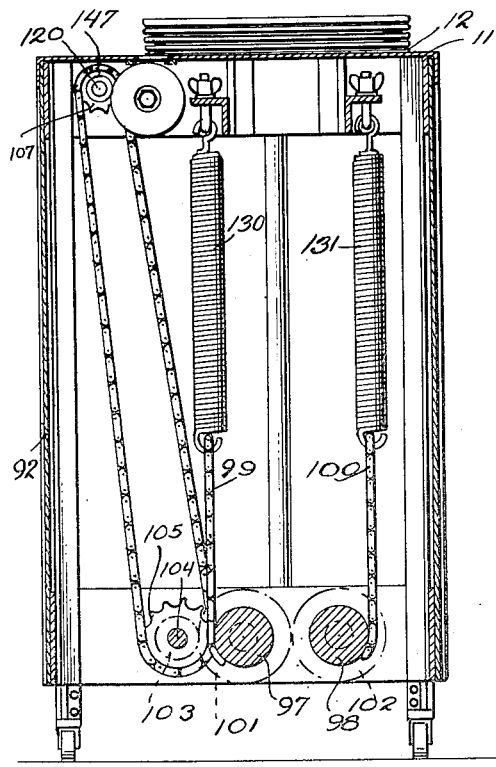
Fig. 16 is an elevation view in section taken along the line 16—16 of Fig. 15, looking in the direction of the arrows.
Figure 15:
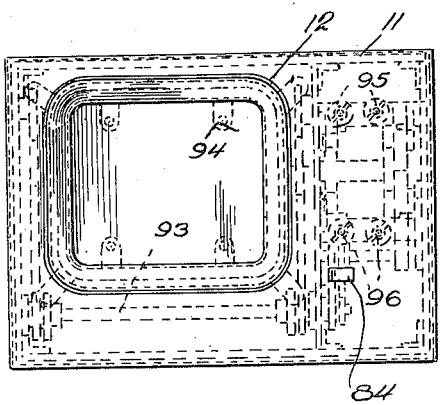

In Figs. 14, 15 and 16, there is somewhat diagrammatically shown an alternate embodiment of carrier motivating means in which casing 92 supports, rotatably mounted in suitable bearings, shaft 93 which latter carries sprockets for driving chains which raise and lower a tray carrier 94 and is operatively connected to the calibrated counterbalancing springs 95, 95 and 96, 96, by means of drums 97 and 98 and chains 99 and 100, serving as connectors between ends of the springs and the drums, with respective intermeshing gears 101 and 102 connected with said drums to keep the latter in mutual driving relation. A pinion 103 meshing with said gear 101 and rotatably mounted on the housing, connects through a common shaft 104 with a sprocket 105, about which passes the lower turn of a sprocket chain 106 whose upper turn passes over a sprocket 107 mounted on said shaft 93.

The springs of the several motivating means are calibrated and so adjusted by the spring tensioning means as to counterbalance any given load of uniform stacked articles on the carriers so that the uppermost units of the stacks are presented for use at a predetermined convenient level or height above the top of the housing. The spring actuated motivating means moves said carrier and its load upwardly upon decrease in the weight of the load thereon for a distance proportionate to the decrease in weight of the load and holds said carrier at the new position. The separate motivating means each respond to an increase in the weight of the loads on the carrier to permit the carrier and its increased load to move downwardly for a distance proportionate to the increase in the load and to hold the carrier and its load in the new position. Each device is charged through the open top by placing stacked articles on the carrier or by adding to a stacked load thereon, the carrier descending during this operation automatically to a position where the uppermost units of the stack assume said predetermined position above the top of the casing. In reverse order the carrier is raised by the motivating means when one or more of the stacked units are removed so that the next uppermost units assume the said predetermined position.

The units are preferably made of counter height for use alongside of or in series with other counter sections, or the units may be independently positioned. The stacks are protected against breakage and the arrangement is such as to provide a protected storage for a maximum number of articles in a minimum of space and at the same time obviate any necessity of a user stooping or reaching as is necessary with shelves and the like. Articles stored within the units may be maintained in pre-heated condition, this being sometimes advantageous where the articles stored are dishes for use in restaurants and hotels. Application of heating means to a service unit is illustrated in the embodiment shown in Figs. 7 and 8 of the drawings, and comprises a blower 110 driven by electric motor 111 for circulating air within the housing, said air circulated by the blower passing through the conduit 112 over electric heaters 113 and by way of the diffusing distributer 114 to the zone adjacent the carriers. Electrical connection of the motor and heating means with suitable outlet is made by cable 115 through the controller 116 housing manually operated circuit makers and breakers whereby the operation of the heating means may be controlled at the will of a user.

While the invention is described in connection with a specific embodiment, it is to be understood that the words used are words of description rather than of limitation, and that practice of the invention within the scope of the appended claims may be resorted to without departing from the true scope and spirit of the invention in all its aspects.

I claim:

1. In a storing and feeding mechanism for stacked articles, in combination, a support having an opening therein, a carrier supported by said support, said carrier being adapted to hold and move a stack of articles thereon through said opening so that the uppermost article is freely positioned at a predetermined elevation above said support, a gearing arrangement comprising sprockets and chains mounted on said support and connected with said carrier for holding, hoisting and lowering the carrier to provide the predetermined positioning of the uppermost stacked article, a spring tensioning mechanism operatively associated with said gearing arrangement and the support and means for calibrating the tensioning mechanism to counterbalance said carrier and any load thereon and to hoist or lower said carrier and its load as the load is decreased or increased.

2. In a storing and feeding mechanism for stacked articles, in combination, a supporting frame having an apertured top, a carrier supported by said frame and adapted for vertical movement and adapted to hold a load of stacked articles with the uppermost article at a predetermined level, carrier supporting means comprising a plurality of spaced aligned sprockets rotatably supported on said frame, a plurality of sprocket chains engaging said sprockets, and an adjustable spring tensioning means in operative relation to said carrier supporting means calibrated to counterbalance said carrier and any load thereon so that the uppermost stacked article thereon will be freely presented at a predetermined level.

3. In a storing and feeding mechanism for stacked articles, in combination, a support having an apertured top portion for passage therethrough of stacked articles, a vertically movable carried adapted to hold a load of stacked articles extending through the aperture in said top portion with the uppermost article of the stack at a predetermined level, means for counterbalancing and motivating said carrier comprising a plurality of spaced aligned members rotatably mounted on said support, a plurality of flexible connections engaging said rotatable members each of said connections having an end thereof fixed to the carrier, and adjustable spring tensioning means operatively associated with the other ends of said flexible connections and calibrated to counterbalance said carrier and any load thereon so that the uppermost stacked article thereon will be freely presented at a predetermined level.

4. The combination of a counter apertured for passage therethrough of stacked articles, a vertically movable carrier adapted to hold a load of stacked articles passing through said counter with the uppermost article of the stack at a predetermined position above the counter, and calibrated means supporting said carrier adapted to move the same and its load upwardly upon decrease in weight of the load thereon and for a distance proportionate to the decrease in weight of the load and to hold said carrier and its decreased load at the new position, said means being also adapted to respond to an increase in the weight of the load on said carrier to permit the carrier and its increased load to move downwardly for a distance proportionate to the increase in the load and to hold said carrier and its load at the new position, said means comprising a calibrated spring tensioning mechanism and movable flexible connections associated with said carrier and tensioning mechanism controlling the movements of the carrier.

5. The combination of a counter having an opening therein for passage of stacked articles, a vertically movable carrier below said opening adapted to hold a load of stacked articles with the uppermost article of the stack at a predetermined elevation with respect to the level of said counter, and calibrated means for holding and motivating said carrier adapted, upon removal of one or more of the stacked articles, to move said carrier and its load upwardly to bring the then topmost article of the stack to said predetermined elevation and to hold it there as long as the load remains unchanged, said means being also adapted to respond to an increase in the weight and height of said stacked articles to permit said carrier and its load to move downwardly to bring the top of the stack to said predetermined level and to hold it there, said means comprising a manually adjustable calibrated spring tensioning mechanism and connections between said mechanism and the carrier.

6. In a storing and feeding mechanism for stacked articles, in combination, a support having an apertured top portion for passage therethrough of stacked articles, a vertically movable carrier beneath said top portion adapted to support a load of stacked articles projecting through the said top aperture, means for counterbalancing and motivating said carrier in its upward movement, said means comprising a calibrated spring tensioning mechanism, a plurality of spaced rotatable chain sprockets mounted on said support and a plurality of sprocket chains trained over said sprockets operatively connecting said spring tensioning means and said carrier, whereby any given load of stacked articles on said carrier is supported in predetermined position with respect to the top portion of said support so that the uppermost unit of the stack is always available for removal at a given point above said top portion.

7. In a storing and feeding mechanism for stacked articles, in combination, a support having a top with an opening therein, a carrier supported by said support, means for supporting said carrier for vertical movement below said support, said carrier being adapted to hold and move a stack of articles thereon through said opening so that the uppermost article is freely positioned at a predetermined elevation above said support, said means comprising a gearing arrangement including a floating unit for holding, hoisting and lowering the carrier to provide the predetermined positioning of the uppermost stacked article, a spring tensioning mechanism operatively associated with said floating unit and gearing arrangement and the support and means for calibrating the tensioning mechanism to counterbalance said carrier and any load thereon and to hoist or lower said carrier and its load as the load is decreased or increased.

8. In a storing and feeding mechanism for stacked articles, in combination, a supporting frame having a top portion apertured for passage therethrough of stacked articles, a carrier arranged for vertical movement in said frame and adapted to hold a load of stacked articles with the uppermost article at a predetermined level, means for supporting and motivating said carrier, said carrier supporting means comprising a block and pulley arrangement connected with said carrier, a connecting member between said block and pulley arrangement serving as a counterbalance against the weight of said carrier, and adjustable spring tensioning means in operative relation to said block and pulley arrangement calibrated to counterbalance said carrier and any load thereon so that the uppermost stacked article thereon will be freely presented at the predetermined level.

9. In a service counter unit, a supporting housing structure having a service top, said top having an aperture therethrough for free passage of stacked articles, a vertically movable carrier below said top aperture for receiving and supporting stacked articles freely movable through the top, motivating means for said carrier comprising tension springs and gearing for movably supporting the carrier and a stack of articles thereon in predetemined counterbalanced position with the uppermost article of the stack at a predetermined level above the top, said motivating means being calibrated to change from or toward its normal for a predetermined distance to a new counterbalancing position for each addition to or removal from the load on said carrier, and means for manually adjusting said motivating means to control the position of the stack in counterbalancing the same.

WILLIAM J. GIBBS.